Nov. 22, 1938.  O. L. ORVOLD  2,137,583
MEASURING DEVICE
Filed June 29, 1936
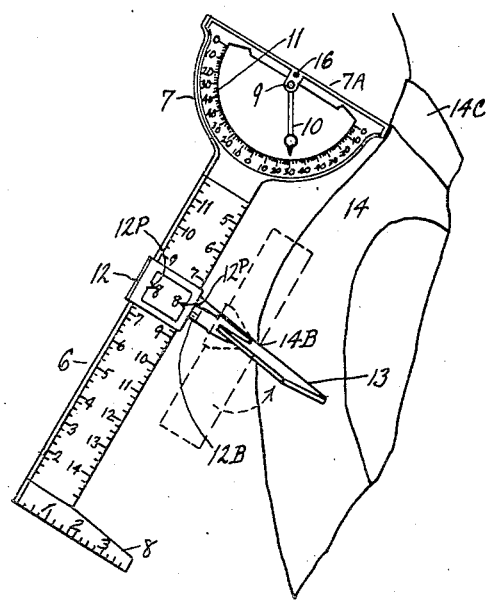
FIG. 1.
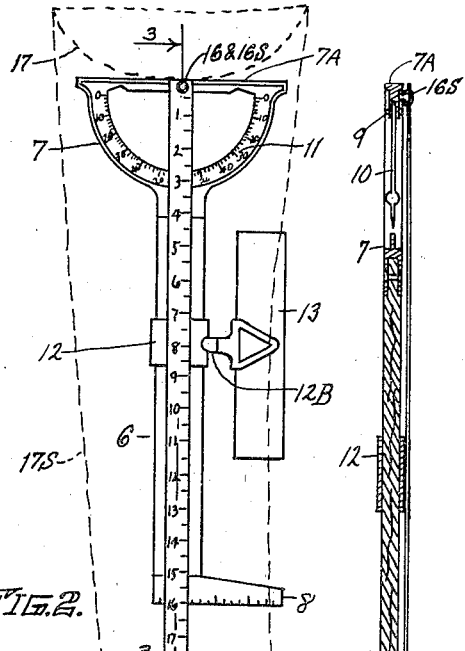
FIG. 2.
FIG. 3.
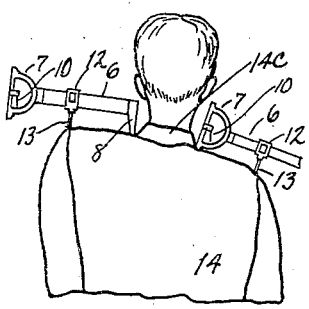
FIG. 4.
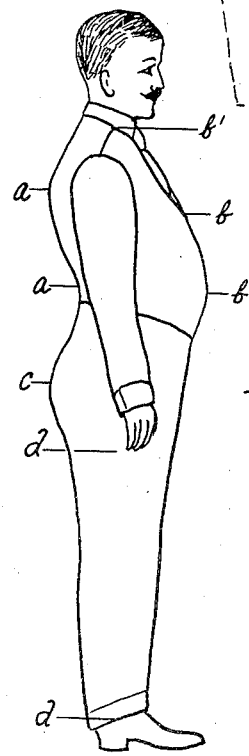
FIG. 5.
INVENTOR:
Oluf L. Orvold
BY David E. Carlsen
ATTORNEY.

Patented Nov. 22, 1938

2,137,583

UNITED STATES PATENT OFFICE 2,137,583

MEASURING DEVICE

Oluf L. Orvold, St. Paul, Minn.

Application June 29, 1936, Serial No. 87,983

2 Claims. (Cl. 33—7)

My invention relates to measuring devices of the class designed particularly for use by tailors for quickly and accurately obtaining the various necessary dimensions for properly making suits or other garments.

The main object of this invention is to provide a measuring device of simple yet highly efficient construction, and further to improve and simplify the measuring device for which a U. S. Patent No. 1,271,486, was issued to me July 2, 1918.

In the accompanying drawing:—

Fig. 1 is a side elevation of my improved measuring device as applied to obtain the measure from a coat collar to the shoulder blade.

Fig. 2 is an elevation of the device as used in combination with a flexible tape to determine the length of a sleeve.

Fig. 3 is a longitudinal vertical section in enlarged scale of Fig. 2 as on line 3—3 of the latter figure.

Fig. 4 is a rear view of the shoulder and head portion of a person with one raised shoulder, two of my devices being shown in operative positions to obtain measures from collar to right and left shoulder tips.

Fig. 5 is a right side view of a model on which are indicated various dimensions of distances required by a tailer for making a suit and which measures are easily attained with my device.

Referring to the drawing by reference numerals, like parts being designated by corresponding characters in the several views, my device comprises an elongated flat bar 6, preferably of wood and to the top end of which is rigidly fixed in common plane with the bar a protractor designated 7 as a whole and at the lower end is fixed a metal foot piece 8 extending at right angles from one side a distance corresponding to the outer extremity of the protractor.

The protractor is of the open type and has a closing cross bar 7A comprising the top end of the device and at the inner central part of which as at 9 is a bearing for a weighted and suspended indicator finger 10 the point of which is in proximity to the arcuate face of the protractor on which face is provided degree marks 11. Said degree marks increase progressively from 0 at a point on the longitudinal center line of the bar 6 to 45 degrees thence decreasing to 0 at each side of said center line on a transverse line through the bearing 9 (see Fig. 1.)

From the center 9 to the outer extremity of the protractor 6 is preferably 3¼ inches, in a preferred size of the device, and likewise the length of the foot piece 8 is 3¼ inches from the center line. Assuming that bar 6 is 1½ inches wide the total length of the foot will be 4 inches said 4 inches and fractions thereof may be indicated on the outer edge of the foot piece, as best shown in Figs. 1 and 2.

On the bar 6 is slidably and frictionally retained a metal clamp 12 with a preferably square opening in each side except a pair of opposite inwardly directed pointers 12P which facilitate reading of the figures on the flat bar. Said figures read progressively downward at one edge and upward at the other edge on each side of the bar and indicate in inches and fractions the various measurements as hereinafter fully set forth.

At the inner side of the clamp 12 is provided a pivot bearing 12B for pivotally retaining an elongated flat wing member 13 normally in common plane with the bar 6 and parallel thereto with its outer edge in alinement between the extremities of the protractor and the foot piece 8 (see Fig. 2).

The wing member 13 is capable of being turned to a position in a plane at right angles to the main bar 6, as in Figs. 1 and 4, for the purpose of obtaining various measurements as from a shoulder blade 14B of a coat 14 to the base of the collar 14C in Fig. 1. In this particular reading the numeral 8 at the inner edge of bar 6 is read and indicated by the right hand pointer 12P of the clamp 12, which means that 8 inches is the distance between said two points and one of the necessary measures to be recorded to make a suit. Simultaneously the angle or slope between the two points thus contacted is indicated in the protractor by the finger or pointer 10, which for example in Fig. 1 reads 30 degrees, the slope or angularity of the plane between the two contact points being 30 degrees from vertical.

In Fig. 4 two shoulder construction readings are shown, the right shoulder normal and the left shoulder deformed and projecting upwardly. The measuring device is placed on the right shoulder in the same manner as in Fig. 1 with the inside and outer corner of the protractor placed at the bottom of collar 14C and the wing bar 13 located to contact at tip of shoulder reading of distance being made in same manner as described for application shown in Fig. 1.

For the raised left shoulder (Fig. 4) the operator reverses the measuring device using the toe end of the foot piece 8 to contact the lower collar line and the wing bar 13 is located to contact the tip of the shoulder, the operator in this case reading the resulting measure on the side of the main bar opposite from the foot piece 8 and simultaneously getting the angle of the shoulder slope.

In Figs. 2 and 3, 15 designates a standard type of tailor's tape measure provided at its end with a snap-button socket 16S adapted to be connected or snapped on a fixed corresponding button or stud 16 on the cross bar 7A and adjacent its pivot 9.

Thus with a flexible tape attached at the top part of my device the latter may be placed or positioned vertically up under the arm pit, designated by dotted line 17 in Fig. 2, and the device held in place while the tape is extended downwardly along the inner side of the arm to determine length of sleeve required. 17S, in dotted lines in Fig. 2, designates the sleeve and its length indicated as 21 inches on the tape. Obviously this feature is useful for determining length of trouser legs from crotch to lower end of pant leg as between lines d—d in Fig. 5.

Besides the measurements already described and referring to Fig. 5 particularly it will be readily understood that further readings and recordings thereof for making a suit will include measuring of various other distances as between lines a—a, b—b', b—b, a—c, d—d etc., etc.

The construction of clamp 12 and the wing bar 13 are not herein claimed specifically being preferably of the construction revealed in my patent herein specified. However the herein described device comprises a greatly simplified construction over my patented device and embodying a single protractor a single main measuring bar with the foot piece all in a new and useful combination and with the wing bar, all measurements obtainable with my previous device being as easily or more easily obtained with this simplified device.

Modifications within the scope of the above description and the following claims may be made without departing from the scope and spirit of my invention.

I claim:

1. A measuring device of the class described comprising an elongated flat bar, a fixed foot piece the toe end of which comprises a contact piece, said foot piece extending at right angles from its lower end, a protractor fixed at the upper end of said bar in common plane with the bar and foot piece, the center of said protractor on the center line of the bar extended, an indicator finger suspended pivotally from said center point and directed toward the bar, a wing member comprising a movable contact piece slidably mounted on the bar, said bar having graduated measure markings indicating exact distances from either end of the measuring device between said contact part of the wing member and the toe of the foot piece and the outer extremity of the protractor.

2. A measuring device comprising a single elongated flat bar provided with two rows of graduated measure marks in opposite directions at its two edges, a clamp slidably mounted on said bar and a straight edge rotatably mounted in said clamp and adapted to be set selectively in parallel relation to the main bar or transversely thereof, a protractor fixed at one end and concentric of said main bar and in common plane therewith, an indicator finger suspended from a point on a center line of the main bar extended and in the center of said protractor its point or free end normally in proximity to the graduated markings at the edge of the protractor, said protractor closed by a cross bar transversely of the main bar and a foot piece integral with and extending at right angles from the opposite end of the bar, the outer end of said foot piece, the outer extremity of the protractor on the same side of the main bar and the outer edge of the straight edge all in a common plane and equidistant from the center line of the main bar.

OLUF L. ORVOLD.